Patented Jan. 19, 1954

2,666,705

UNITED STATES PATENT OFFICE 2,666,705

SHORTENING COMPOSITIONS AND
METHOD OF MAKING THE SAME

Elmer F. Glabe, Chicago, Ill., assignor to Food Technology, Inc., Chicago, Ill., a corporation of Illinois No Drawing. Application October 26, 1950,
Serial No. 192,375

18 Claims. (Cl. 99—118)

This invention relates in general to the preparation of shortening compositions and more particularly to a shortening composition containing an activated emulsifying agent.

The term "shortening" is used herein as meaning any fatty material suitable for the making of friable products, such as pastries. It is considered to include all fats which enter into any kind of cooking or baking operation. Hence, lard, butter and other animal fats and oils, fish oils, coconut oils, palm oils, olive oils, cotton seed oils, soy bean oils and other vegetable oils are included under the term "shortening." The modified fats and oils, such as the hydrogenated fats and oils are likewise intended to be included. Margarine in all of its various forms is also included.

Shortening is an indispensible ingredient of bakery products, candies and confections. It is also indispensible in cooking operations such as deep fat frying. Unfortunately, it has always suffered the limitation that it is essentially incompatible with aqueous liquids and to a lesser degree with the proteins and starches of food products. Methods and apparatus have been developed which have facilitated the physical mixing of the ingredients, but improper dispersion of shortening still remains the chief limitation. Improper dispersion results in poor physical mixing of ingredients and in the subsequent separation of fatty and liquid components. The result in bakery products, for instance, is that they readily lose their moist, soft texture and exhibit poor keeping qualities.

It is an object of this invention to provide a shortening composition which will be exceptionally compatible with other food ingredients.

Another object of the invention is to provide a shortening composition which will form a stable emulsion with aqueous liquids.

Another object of the invention is to provide a shortening composition having improved mixing qualities with other bakery ingredients.

A further object of the invention is to provide a shortening composition which will not spatter during cooking operations.

A still further object of the invention is to provide a shortening composition which may be used in smaller proportions than unmodified shortenings without sacrificing results.

Other objects and advantages of the invention will become apparent from a consideration of the following description and examples.

According to the present invention an improved shortening composition is provided by the incorporation with fatty bodies of an activated dihydroxyphospholipid composition. This shortening composition exhibits exceptional properties in the manner in which it combines with aqueous liquids and other food ingredients to form stable mixtures. The natural tendency of these ordinarily incompatible ingredients to separate is greatly retarded and substantially stable emulsions and dispersions are formed.

Further in accordance with the present invention, the unusual shortening composition described herein comprises an intimate mixture of a shortening and an emulsifying quantity of an activated dihydroxyphospholipid. Activation of the dihydroxyphospholipid has been found to be necessary in order that the unusual effects recited herein may be realized. In its natural unactivated state, the dihydroxyphospholipid exhibits no unusual effect beyond that obtainable by the use of similar compounds. Upon activation of the dihydroxyphospholipid, however, it becomes unusually effective in promoting the dispersion of shortening in aqueous liquids and in food ingredients generally. Shortening compositions having the unusual dispersibility of my new shortening composition have heretofore been unobtainable because other known edible emulsifying agents will not give the results outlined herein for my composition.

Activation of the dihydroxyphospholipid is necessary for the purpose of the invention and is preferably carried out according to the method outlined herein. An emulsifying agent is considered to have two functional portions, i. e., a fat emulsifying portion and a water emulsifying portion. Activation of both of these functional portions of a dihydroxyphospholipid compound is desirable for the purpose of this invention. The dihydroxyphospholipid will not be activated satisfactorily merely by mixing it with the fatty bodies, water and other ingredients of a cooking or baking composition.

Depending upon the type of dihydroxyphospholipid available, it will be preferable to activate either the fat emulsifying portion or the water emulsifying portion selectively. One commercial type of dihydroxyphospholipid composition consists of the compound in an oily medium. This will not mix with water. But, if the fat emulsifying portion of the oily dihydroxyphospholipid is activated with a quantity of fatty material before any water is added, the fat activated dihydroxyphospholipid will then readily emulsify with water.

Another type of dihydroxyphospholipid composition is the solid, dry material from which the oils have been extracted. This material is dispersible in water and it will be satisfactory to emulsify either the fat emulsifying portion or the water emulsifying portion of such a dihydroxyphospholipid. If it is preferable to activate first the fat emulsifying portion of the dihydroxyphospholipid compound, the dihydroxyphospholipid should be pre-mixed with a portion of a shortening compound prior to the activation of the water emulsifying portion. The activating process may be reversed in certain cases by mixing the dihydroxyphospholipid first with an activating quantity of water or aqueous liquid followed by mixing with a quantity of fat.

A certain amount of moisture is required to activate the water emulsifying portion of the dihydroxyphospholipid compound. The optimum amount is about 40% by weight of water based on the weight of dihydroxyphospholipid. It has been observed, however, that as little as 10% by weight of water will activate the dihydroxyphospholipid to an appreciable degree. About 85% by weight of water represents the approximate maximum and additions of water above this amount, while not harmful to the dihydroxyphospholipid, will not appreciably increase the degree of activation.

In like manner, a definite amount of fat is required to activate the fat emulsifying portion of the dihydroxyphospholipid compound. Some activation has been observed when about 8.5% by weight of fat is mixed with the dihydroxyphospholipid. Optimum activation takes place when approximately 167% by weight of fat is present. Up to 300% by weight of fat has been found to be effective for the purpose of the invention, but beyond this amount no appreciable increase in activation is noted. Larger amounts of fat do not have an adverse effect upon the emulsifying properties of the activated dihydroxyphospholipid, but should be avoided for economic reasons.

The activated dihydroxyphospholipid disclosed in this invention may take several alternative forms. It may be (a) A plastic composition which comprises suitable amounts of dihydroxyphospholipid and fatty material and a relatively small amount of water. The amount of water must be within the minimum establshed above in order to effectively activate the water activated portion of the dihydroxyphospholipid compound (10% by weight).

(b) An emulsion prepared similarly to the plastic composition but containing larger activating quantities of water.

(c) A dry mix which comprises suitable quantities of dihydroxyphospholipid, fat and water and which also contains quantities of a dry solid material, such as a starch or sugar, to render the final composition substantially dry in appearance and feel.

One form of activated dihydroxyphospholipid according to (b) above, may be prepared by pre-mixing about 6 pounds of dihydroxyphospholipid with about 10 pounds of fatty material. Then about 2.5 pounds of water is intimately mixed with the fat activated product. An emulsion is formed in which the dihydroxyphospholipid is both fat activated and water activated. This emulsion may be incorporated with fatty materials in the proportions related hereinafter to prepare a shortening composition which will have unusual compatability with aqueous liquids and other ingredients of food products.

Another form according to (c) above, may be prepared by pre-mixing about 6 pounds dihydroxyphospholipid with about 10 pounds of fatty material. Then about 84 pounds of an amylaceous material having a relatively high moisture content is intimately mixed with the fat activated product. A substantially dry composition is formed in which the dihydroxphospholipid is both fat activated and water activated. It is important that the amylaceous material have a high moisture content and especially that it contain an amount of water that is not bound to the starch material. Potato starch is a good example of such amylaceous material because it is characterized by relatively high water content. Preferably the starchy material should contain from about 6% to 14% by weight of water because usually only a portion of this water is available, the remainder being bound up by the starch. If the unbound water is not sufficient in quantity to supply the critical amount of moisture disclosed herein as necessary to activate the water emulsifying portion of the dihydroxyphospholipid, then an additional amount of water must be added to supply the deficit.

The amount of activated dihydroxyphospholipid in the shortening composition may be varied over a range of concentrations depending chiefly upon the manner in which the shortening composition is to be used. For example, as little as 0.03% or as much as 30.0% activated dihydroxyphospholipid by weight, based upon the weight of the shortening, may be incorporated with fatty materials into shortening compositions which give the exceptional results disclosed herein. In some bakery products shortening compositions containing from 0.1% to 10.0% activated dihydroxyphospholipid may be employed. It should be understood that concentrations of activated dihydroxyphospholipid above 30.0% by weight may be used without harm, but in most instances no appreciable increase in dispersibility will be achieved by using larger amounts.

In a specific instance, i. e., the making of bread, a shortening composition containing about 0.3% to 0.5% by weight of activated dihydroxyphospholipid has been found to give a product having soft crumb structure and good keeping qualities.

The activated dihydroxyphospholipids may be incorporated into my new shortening composition at any stage in the processing of the shortening. For example, the emulsifying agent may be added near the end of the processing operation, i. e., after severe operating conditions have been passed.

As an example of the unusual results obtained by the practice of this invention in which an activated dihydroxyphospholipid modified shortening composition is employed, a process for making bread by the sponge and dough method is shown. First, a standard formula is prepared according to the following instructions:

360 grams spring wheat patent flour
12 grams yeast
1.25 grams yeast food
216 cc. water Mix 3 minutes and ferment at 80 degrees F. for 3½ hours. Then add:

240 grams winter wheat patent flour
18 grams sugar
18 grams powdered skim milk
24 grams lard
12 grams salt
170 cc. water Mix 3 minutes and ferment 20 minutes at 80 degrees F. Divide the formula into 2 portions of 450 grams each and mold, and place in pans. Retain the molded formula at 95 degrees F. for 50 minutes at a relative humidity of about 90%. Then bake the dough at 425 degrees F. for 30 minutes.

In place of the shortening used in the standard bread formula shown above, I may substitute one-half as much of my new shortening composition prepared by adding to shortening an activated dihydroxyphospholipid emulsifying agent. The bread obtained has a softer crumb texture and improved keeping qualities over those of a product made in the standard manner. It will be noted that a saving of 50% of the shortening required has been effected.

Similar advantages may be obtained by substituting my improved shortening composition in the standard pound cake formula shown below:

*Pound cake formula*

350 grams flour
250 grams sugar
210 grams shortening
20 grams milk powder
10 grams salt
130 grams water
218 grams eggs Sift flour twice. Place all ingredients in larger mixing bowl. Mix on low speed 1 minute and scrape well. Mix on second speed 5 minutes and scrape. Mix on second speed 5 minutes longer and scrape. Finish mixing on second speed 2 minutes but do not scrape. Scale 2½ pounds into paper lined pans, very lightly greased or lined with brown paper. Bake at 325 degrees F. for 1½ hours.

Here again my new shortening composition may be substituted in considerably lesser amounts than the ordinary shortening requirement. Cakes in which my new shortening composition has been used are remarkably softer in texture than the standard pound cake. Additionally, the modified cake has better keeping properties since it will retain a soft crumb structure for a considerable time and will not become hard and crumbly as quickly as standard pound cake.

In the baking of cookies, similar unusual results may be obtained by substituting my shortening composition containing an activate dihydroxyphospholipid emulsifying agent for ordinary shortening. A standard cookie may be made according to the following formula:

Mix 80 grams fine granulated sugar with 80 grams vegetable shortening for one minute at slow mixing speed and scrape. Add 1.25 grams salt and 0.31 gram soda and mix for one minute at medium speed and scrape. Add slowly 10 grams whole egg and 1.25 grams vanilla while mixing at medium speed and scrape. Then add 55 cc. of water, 0.08 gram of ammonia and 10 grams corn syrup while mixing at medium speed and scrape. Incorporate 125 grams cookie flour and mix for 30 seconds at slow speed and scrape. Bake at 375 degrees F. until lightly browned.

In the standard cookie formula it is possible to substitute a considerably smaller quantity of my new shortening composition for the ordinary vegetable shortening. Cookies made with the modified shortening have a smoother texture and remain crisp longer than similar cookies made in the standard fashion. Under standard adverse storage conditions, the cookies made with my shortening composition exhibit far superior keeping qualities over unmodified cookies.

The new shortening composition containing an activated dihydroxyphospholipid may be substituted for ordinary shortening in the preparation of any other type of bakery goods, such as, for instance, yellow layer cakes, white layer cakes, chocolate cakes, pie crust, biscuits, crackers, rolls coffee cake, doughnuts, yeast raised breads, salt rising breads, and breads made by the straight dough and dough brake methods. In addition to the fact smaller quantities of the new shortening composition give better baking results, the finished products have a smoother crumb texture and a longer shelf life as a result of using shortening containing a fat and water activated dihydroxyphospholipid.

It has been found that shortening compositions to which an activated dihydroxyphospholipid has been added gives improved results over standard shortening when used in deep fat frying operations. Frying is more rapid and uniform, probably due to better contact between the shortening and the article being fried. One of the chief problems which has always accompanied deep fat frying operations is the spattering which occurs when foreign materials, such as water, are introduced into the hot fat. It has now been found that even though water is present in small amounts, spattering is virtually eliminated in an activated dihydroxyphospholipid modified shortening composition.

In candies and confections in general, the use of the modified shortening has been found to give unusual results. In chocolate coatings the modified shortening promotes smooth and even coatings and prevents rapid oxidation and discoloration of the chocolate. The use of shortening containing activated dihydroxyphospholipid in the preparation of creams results in a smooth homogeneous mixture of ingredients and prevents loss of moisture from the mix. The creams are found to have a much smoother texture than those made with ordinary shortening.

The dihydroxyphospholipids referred to herein may be obtained by treating phosphatids under conditions which bring about hydroxylation of the phosphatide. Phosphatides have the general formula

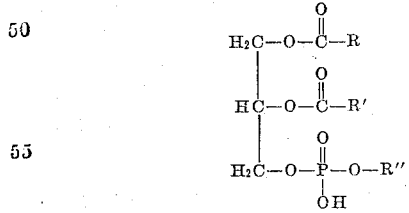

where R and R' are the hydrocarbon radicals of the higher fatty acids, some of which are unsaturated and R'' is either a choline radical, a cholamine radical or a serine radical. The phosphate radical may occupy either the alpha or beta position. In the lecithins, R'' is the choline radical, and in the cephalines R'' is the cholamine radical.

It has been found that hydroxylation of such molecules at the double bonds of the unsaturated fatty acid radicals can be accomplished by treating the phosphatides with hydrogen peroxide, preferably in the presence of a water soluble aliphatic carboxylic acid, e. g., acetic, lactic, citric, tartaric, or the like, or with the peracids of such water soluble aliphatic carboxylic acids, e. g., peracetic, perlactic, or the like.

The resulting product has a decreased unsaturation as measured by the iodine value, indicating hydroxylation. It has not been possible to directly measure the hydroxyl groups, since the conditions for such measurement result in decomposition of the phosphatide. However, the product has been hydrolyzed and acetyl values determined on the fatty acids recovered. These show a substantial increase in acetyl values over the acids recovered from the untreated phosphatides, and clearly indicate that hydroxylation occurs on the fatty acid portion. Dihydroxystearic acid has also been recovered from the hydrolysate of the treated material.

In a specific example 100 grams of crude soy bean lecithin, having an iodine value of 95.7, were warmed to approximately 50 degrees C., at which temperature it melts. Three (3) grams of 75% lactic acid were added and mixed in and 14 grams of 100 volume $H_2O_2$ were added slowly with agitation while maintaining the temperature at 50 degrees C. This mixture was stirred for one hour at 50 degrees C. and then dried under a vacuum of 27.5 inches until the moisture content was less than 1%. The iodine value of the resulting material was 84.0. This material is easily emulsified in water and is a very effective emulsifying agent.

The phosphatide materials are preferably hydroxylated from 5% to 25%, depending upon the concentration of materials used, the time and the temperature. It is important that the temperature of hydroxylation be maintained below 75 degrees C. in order to prevent decomposition of the raw materials. The dihydroxyphospholipids exhibiting the best results are obtained by hydroxylating to about 10% as measured by reduction in the iodine value.

This application is a continuation in part of my copending application, U. S. Serial No. 45,563, filed August 21, 1948.

It will be apparent from the foregoing disclosure that my new shortening composition has unusual and novel properties which have not been known heretofore in the shortening art.

The invention is hereby claimed as follows:

1. An edible shortening composition consisting essentially of a shortening compound and an activated dihydroxyphospholipid which has been rendered active by intimately pre-mixing therewith before addition to the shortening between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

2. An edible shortening composition consisting of a shortening compound and a quantity of an activated dihydroxyphospholipid sufficient to emulsify said shortening, said activated dihydroxyphospholipid having been rendered active by intimately pre-mixing therewith before addition to the shortening between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

3. An edible shortening composition consisting essentially of a mixture of a shortening compound and from 0.03% to 30.0% by weight of an activated dihydroxyphospholipid which has been activated by intimately mixing therewith between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

4. An edible shortening composition consisting essentially of a mixture of lard and from 0.03% to 30.0% by weight of an activated dihydroxyphospholipid which has been activated by intimately mixing therewith between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

5. An edible shortening composition consisting essentially of a mixture of hydrogenated fatty bodies and from 0.03% to 30.0% by weight of an activated dihydroxyphospholipid which has been activated by intimately mixing therewith between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

6. An edible shortening composition consisting essentially of a mixture of margarine and from 0.03% to 30.0% by weight of an activated dihydroxyphospholipid which has been activated by intimately mixing therewith between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

7. The method of making an edible shortening composition which consists essentially of mixing together a shortening compound and an activated dihydroxyphospholipid which has been rendered active by intimately pre-mixing therewith before addition to the shortening between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

8. The method of making an edible shortening composition which consists essentially of mixing with a shortening compound a quantity of an activated dihydroxyphospholipid sufficient to emulsify said shortening, said activated dihydroxyphospholipid having been rendered active by intimately pre-mixing therewith before addition to the shortening between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

9. The method of making an edible shortening composition which consists essentially of mixing with a shortening compound from 0.03% to 30.0% by weight of an activated dihydroxyphospholipid which has been pre-activated by intimately mixing therewith between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

10. The method of making an edible shortening composition which consists essentially of mixing with lard from 0.03% to 30.0% by weight of an activated dihydroxyphospholipid which has been pre-activated by intimately mixing therewith between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

11. The method of making an edible shortening composition which consists essentially of mixing with hydrogenated fatty bodies from 0.03% to 30.0% by weight of a dihydroxyphospholipid which has been pre-activated by intimately mixing therewith between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

12. The method of making an edible shortening composition which consists essentially of mixing with margarine from 0.03% to 30.0% by weight of an activated dihydroxyphospholipid which has been pre-activated by intimately mixing therewith between about 8.5% and 300% by weight of fatty material and between about 10% and 85% by weight of water, said dihydroxyphospholipid being a hydroxylated phosphatide which is hydroxylated at the double bonds of the unsaturated fatty acid portion of the phosphatide.

13. An activated emulsifying agent consisting essentially of a dihydroxyphospholipid intimately mixed with amounts of a fatty body and water effective to activate the dihydroxyphospholipid, said dihydroxyphospholipid being a hydroxylated phosphatide which is hydroxylated at the double bonds of the unsaturated fatty acid portion of the phosphatide.

14. An activated emulsifying agent consisting essentially of a dihydroxyphospholipid intimately mixed with between about 8.5% and 300% by weight of a fatty material and between about 10% and 85% by weight of water, said dihydroxyphospholipid being a hydroxylated phosphatide which is hydroxylated at the double bonds of the unsaturated fatty acid portion of the phosphatide.

15. The method of activating a dihydroxyphospholipid emulsifying agent which consists essentially of intimately mixing therewith amounts of a fatty body and water effective to activate the dihydroxyphospholipid, said dihydroxyphospholipid being a hydroxylated phosphatide which is hydroxylated at the double bonds of the unsaturated fatty acid portion of the phosphatide.

16. The method of activating a dihydroxyphospholipid emulsifying agent which consists essentially of intimately mixing therewith between about 8.5% and 300% by weight of a fatty material and between about 10% and 85% by weight of water, said dihydroxyphospholipid being a hydroxylated phosphatide which is hydroxylated at the double bonds of the unsaturated fatty acid portion of the phosphatide.

17. An edible shortening composition consisting essentially of a mixture of shortening and from 0.03% to 30.0% by weight of an activated dihydroxyphospholipid which has been activated by mixing together 6 parts by weight of dihydroxyphospholipid, about 10 parts by weight of shortening and about 2.5 parts by weight of water, said dihydroxyphospholipid being a hydroxylated phosphatide which is hydroxylated at the double bonds of the unsaturated fatty acid portion of the phosphatide.

18. An edible shortening composition consisting essentially of a mixture of shortening and from 0.03% to 30.0% by weight of an activated dihydroxyphospholipid which has been activated by mixing together 6 parts by weight of dihydroxyphospholipid, about 10 parts by weight of shortening and about 84 parts by weight of an amylaceous material characterized by having an amount of available moisture sufficient to activate the water activated portion of dihydroxyphospholipid, said dihydroxyphospholipid being a hydroxylated phosphatide which is hydroxylated at the double bonds of the unsaturated fatty acid portion of the phosphatide.

ELMER F. GLABE.

References Cited in the file of this patent

UNITED STATES PATENTS

| Number | Name | Date |
| --- | --- | --- |
| 1,859,240 | Jordan | May 17, 1932 |
| 1,936,718 | Jordan | Nov. 28, 1933 |
| 2,062,782 | Epstein et al. | Dec. 1, 1936 |
| 2,201,064 | Thurman | May 14, 1940 |
| 2,445,948 | Wittcoff | July 27, 1948 |

OTHER REFERENCES

"Organic Chemistry," by Paul Karrer, second English edition, Elsevier Publishing Company, Inc., New York, 1946, page 206.